United States Patent [19]

Breitfuss

[11] 4,343,573

[45] Aug. 10, 1982

[54] METHOD AND APPARATUS FOR MAKING AN UNDERGROUND PIPELINE

[76] Inventor: Thomas K. Breitfuss, 17541 Orange Tree La., Tustin, Calif. 92680

[21] Appl. No.: 178,894

[22] Filed: Aug. 18, 1980

[51] Int. Cl.$^3$ .................... E02D 29/10; E02F 5/10
[52] U.S. Cl. ..................... 405/155; 405/179
[58] Field of Search ............ 405/154, 155, 169, 170, 405/174, 179, 184; 249/11; 264/31, 35; 414/747; 425/59, 63

[56] References Cited

U.S. PATENT DOCUMENTS

| | | | |
|---|---|---|---|
| 2,830,548 | 4/1958 | McElvany | 405/179 X |
| 3,292,379 | 12/1966 | McElvany | 405/179 |
| 3,309,799 | 3/1967 | Kinkade | 405/174 X |
| 3,830,606 | 8/1974 | Breitfuss | 425/59 |
| 3,906,737 | 9/1975 | Brown | 405/179 |
| 4,087,219 | 5/1978 | Breitfuss | 405/155 X |
| 4,197,033 | 4/1980 | Gendron | 405/170 |

*Primary Examiner*—David H. Corbin
*Attorney, Agent, or Firm*—Gordon L. Peterson

[57] ABSTRACT

A method of forming an underground pipeline comprising depositing an inner component section of the pipeline on a pipe-laying apparatus and at least partially supporting the inner component section on the apparatus. The inner component section is forced from the apparatus onto an independent support, and the apparatus is advanced to receive another inner component section. After the inner component sections have been transferred to the independent supports, a formable outer component is provided at least part way around and beneath such inner component sections to form the pipeline.

18 Claims, 9 Drawing Figures

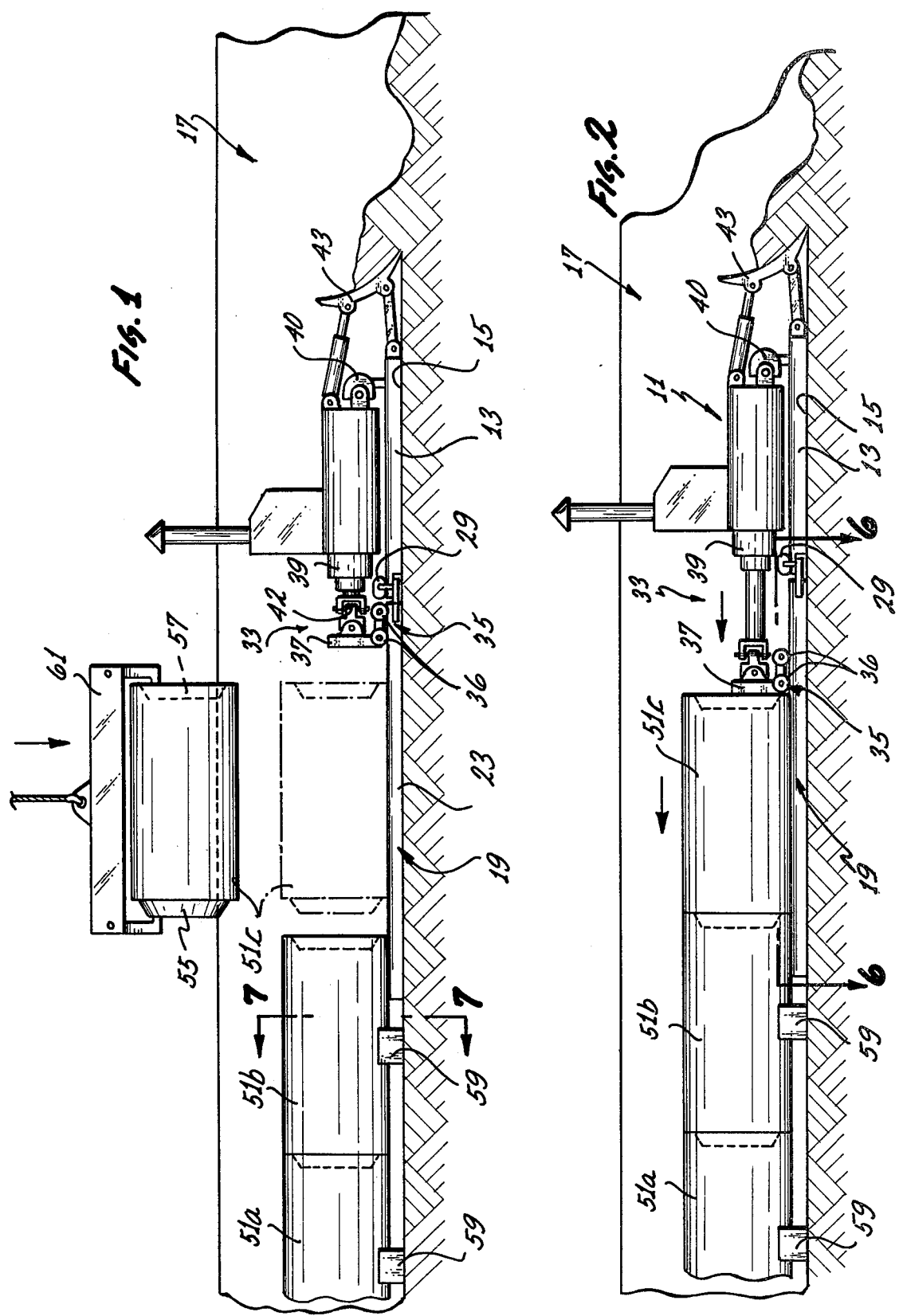

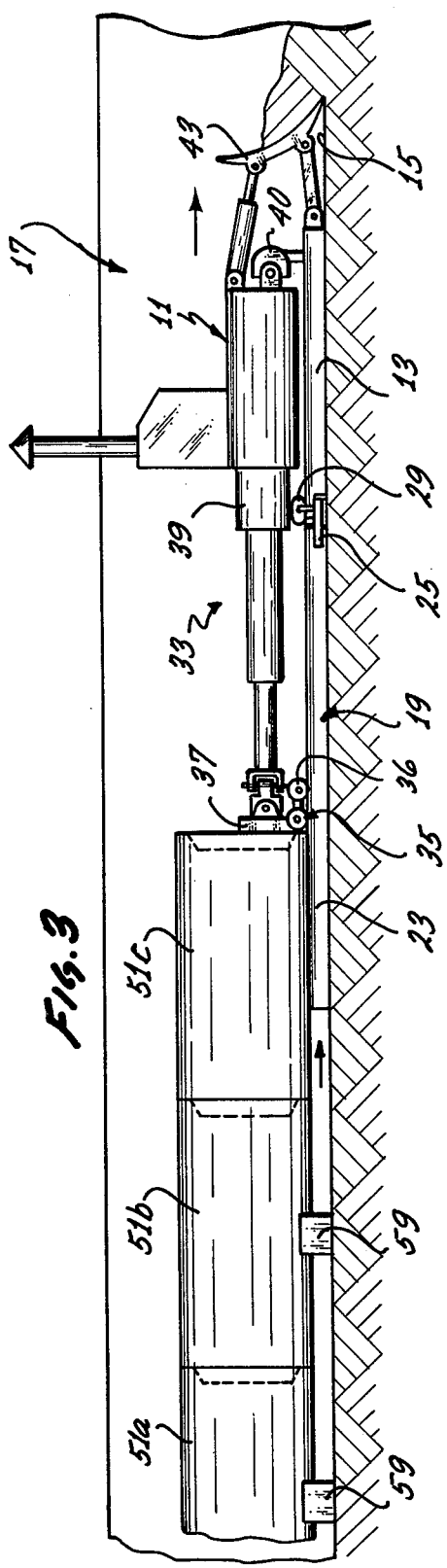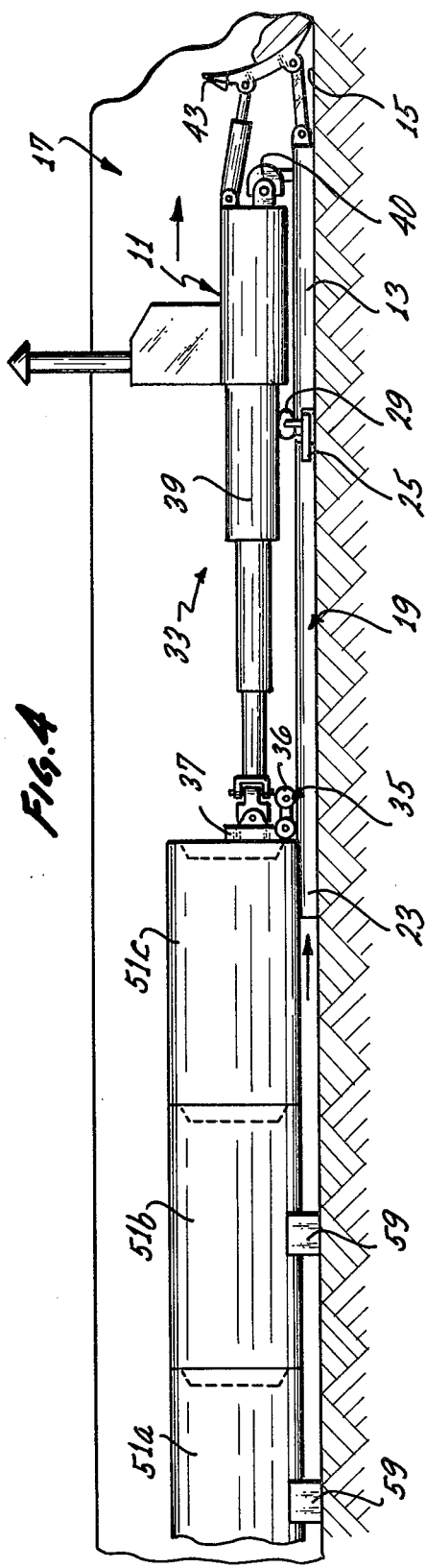

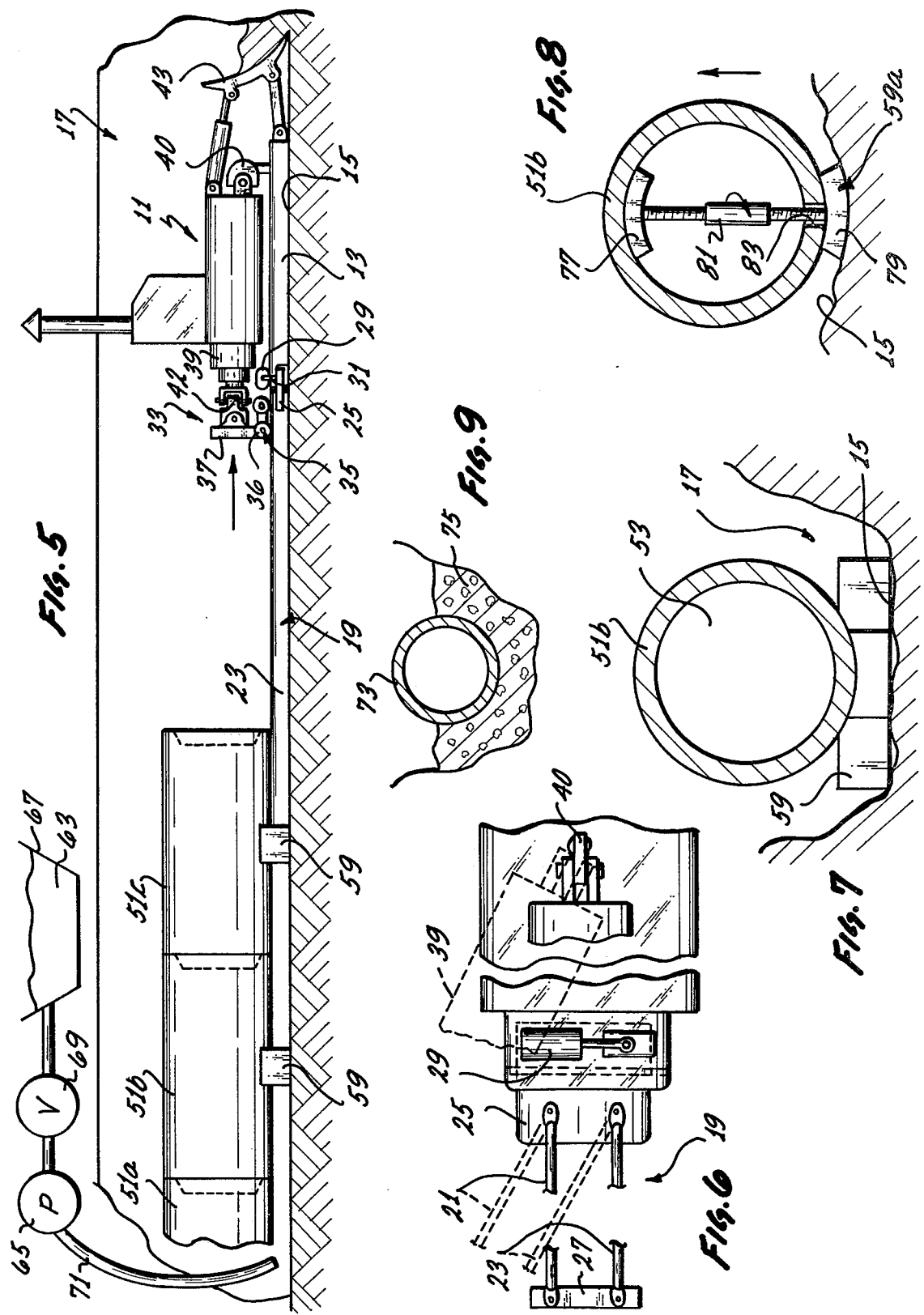

METHOD AND APPARATUS FOR MAKING AN UNDERGROUND PIPELINE

BACKGROUND OF THE INVENTION

One form of pipeline includes, at least during construction of the pipeline, an inner component at least partially enclosed by a formable outer component. At least during construction, the inner component typically includes a plurality of inner component sections in end-to-end relationship. Each of the inner component sections may be, for example, a pipe section, a core unit or an inner form. If a pipe section or core section is used, such section remains as a permanent part of the pipe. However, if a form is used, it is removed after the outer component is applied, and in this event, the form is part of the pipeline only during construction of the pipeline.

The formable outer component may be a variety of flowable material used to encase, or partially encase, the inner component. For example, the formable outer component may be a cementitious material, such as concrete or other materials, which is flowable and curable to form a casing, or partial casing, for the inner component. Alternatively, the formable outer component may be a cushion or a noncurable material, such as sand or soil. The resulting pipeline can be made capable of carrying various materials, including liquids.

My prior U.S. Pat. Nos. 3,830,606 and 4,087,219 disclose apparatuses for forming underground pipelines of the type described above. Each of these patent constructions includes a receptacle for receiving an inner component section and a bulkhead at one end of the receptacle. The bulkhead has an outlet opening so that the inner component section can be passed through the outlet opening and be joined to a previously laid inner component section. The formable outer component is flowed around an inner component section as the inner component section is moved through the outlet opening of the bulkhead.

Both of these apparatuses function very satisfactorily as do the methods disclosed in both of my prior patents. However, the methods described in my prior U.S. patents are not as well suited as desired for certain applications.

More particularly, the placement or flowing of the outer component simultaneously with the passing of the inner component section through the outlet opening of the bulkhead can present problems. For example, if the flowable outer component is not available, the placement of the inner component sections must be abated, and this can delay completion of the job and increase job costs. Also, there are instances in which placement of the inner component sections can proceed at a fastener rate than the placement of the outer component sections. In addition, there is a potential problem of leakage of the flowable outer component through the outlet opening in the bulkhead. Also, when the inner component section has an axially protruding bell for attachment to an adjacent inner component section, the pipe-laying apparatus must have special features to accommodate the bell and to avoid leakage of the outer component through the outlet opening of the bulkhead. Finally, a sufficient amount of the outer component must be used to float and, therefore, support the inner component sections, otherwise the lower regions of the inner component section would not be encased in the outer component.

SUMMARY OF THE INVENTION

This invention provides a method which solves the problems identified above. With the method of this invention, placement of the outer component is carried out independently of the placement of the inner component sections. Accordingly, outer component placement does not restrict placement of the inner component sections, and the outer component can be placed at a conveniently selected time.

In a broad sense, this invention provides for flowing the outer component at least beneath a first inner component section subsequent to the placement of a second inner component section. As a practical matter, however, a first group of inner component sections will ordinarily be placed before the step of flowing the outer component section around such group is initiated. The group may be two or more of the inner component sections.

According to this invention, an apparatus is provided for assisting in installing the inner component sections with the apparatus being provided on a surface which is to support the pipeline. For example, the surface may be the bottom of a trench in which the pipeline is to be laid. Inner component sections are repeatedly and sequentially deposited on the apparatus, with the apparatus at least partially supporting the inner component sections placed thereon. The inner component sections supported on the apparatus are forced from the apparatus in a way to accomplish initial installation of the inner component sections.

It is necessary that the outer component be provided at least beneath the inner component sections, i.e., between the bottom of the inner component sections and the bottom of the trench. To enable this to occur, the method of this invention includes providing inner component section supporting means on the surface in general alignment with the apparatus. Accordingly, the forcing of the inner component sections from the apparatus transfers at least some of the support of such inner component section to the inner component section supporting means. At some later time, the outer component is flowed at least beneath the inner component sections which are supported on the inner component section supporting means. If desired, the initiation of the flow of a formable outer component beneath the inner component sections can be carried out after the step of forcing has been discontinued, and floating of the inner component section with the outer component is not required.

The inner component sections can be deposited on the apparatus utilizing a crane or other suitable device. The apparatus may align the inner component section deposited thereon with previously installed inner component sections.

The forcing step can advantageously be carried out by reactive pushing means carried by the apparatus. The reactive means pushes the inner component section rearwardly against the previously installed inner component section. Thereafter, additional pushing by the reactive means advances the apparatus forward to make room for the deposit of another inner component section on the apparatus.

The apparatus can advantageously include a grading implement so that it can form or shape the bottom of the trench as it moves forward. Such use of a grading implement obviates the need for trench boxes and fine-grading personnel.

Although the apparatus may have a bulkhead as provided in my prior patents referred to above, the bulkhead is not necessary and can be eliminated. Accordingly, this method enables a simplified apparatus to be used, if desired.

The inner component section supporting means can be of various different constructions. For example, the inner component section supporting means may include supporting blocks, inflatable diaphragms, soil or soil-like material, jacks, a support integral with the inner component section, a previously laid inner component section or combinations of the above.

To better enable the apparatus to align the inner component section placed thereon and to enable the apparatus to be used when the pipeline is nonlinear, the apparatus preferably includes a frame and a support section attached to the frame to permit movement of the support section generally transversely relative to the frame. The support section is adapted to support an inner component section thereon. By moving the support section generally transversely relative to the frame, the axes of the frame and the support section can be angularly adjusted to align the inner component section supported on the support section.

In order to force the inner component section from the support section, an extendable actuator is pivotally attached to the frame and mounted for movement along the support section. A pushing member is carried by the actuator to engage the inner component section to push such inner component section away from the frame. Because the actuator is pivotally attached to the frame, it can pivot to track with the support section in various angular positions of the support section.

In a preferred construction, the support section includes at least one rail, and a region of the actuator is mounted on the rail by at least one roller. Universal joints can advantageously be used to attach the actuator to the frame and to the pushing member.

The invention, together with further features and advantages thereof, may best be understood by reference to the following description taken in connection with the accompanying illustrative drawing.

BRIEF DESCRIPTION OF THE DRAWING

FIG. 1 is a somewhat schematic elevational view illustrating how an inner component section can be deposited on a pipe-laying apparatus.

FIG. 2 is a view similar to FIG. 1 showing how the pipe-laying apparatus forces the previously deposited inner component section rearwardly into engagement with a previously installed inner component section.

FIG. 3 is a view similar to FIG. 1 illustrating the initial advancing and grading movements of the pipe-laying apparatus.

FIG. 4 is a view similar to FIG. 1 showing the completion of the advancing and grading movements of the pipe-laying apparatus.

FIG. 5 is a view similar to FIG. 1 with an additional inner component section support positioned beneath and supporting the most recently laid inner component section.

FIG. 6 is a fragmentary view taken generally along line 6—6 of FIG. 2 and showing a portion of the pipe-laying apparatus which supports and aligns the inner component sections and illustrates angular pushing.

FIG. 7 is a sectional view taken generally along line 7—7 of FIG. 1.

FIG. 8 is a sectional view similar to FIG. 7 showing an alternate way of supporting the inner component sections after they have been transferred from the pipe-laying apparatus.

FIG. 9 is a sectional view on a reduced scale showing a completed pipeline.

DESCRIPTION OF THE PREFERRED EMBODIMENT

The method of the invention is carried out utilizing a pipe-laying apparatus 11 which is shown in FIGS. 1-6. Although the apparatus 11 can be of various different constructions, in the embodiment illustrated, it includes a frame 13 which is slidable along the bottom 15 of a trench 17. The bottom 15 of the trench 17 forms a support for the apparatus 11.

The apparatus 11 includes a support section or an alignment and supporting device 19 (FIGS. 5 and 6) which generally includes a pair of rails 21 and 23 pivotally coupled at their forward ends to an alignment plate 25 and at their other ends to a crossbar 27. A hydraulic actuator 29 is carried by the frame and is coupled to the alignment plate 25 by a coupler 31 to enable the hydraulic actuator 29 to position the alignment plate 25 transversely of the rails 21 and 23.

The apparatus 11 also includes reactive pushing means 33 coupled to the rear of the frame 13. In the embodiment illustrated, the pushing means 33 includes a trolley 35 having wheels 36 which ride on the rails 21 and 23, a pushing member 37 carried by the trolley and a hydraulic actuator 39 pivotally mounted on the frame 13 by a universal joint 40 and pivotally coupled to the trolley 35 by a universal joint 42. The actuator 39 can be extended and retracted as shown in FIGS. 1-5 so as to move the trolley 35 along the rails 21 and 23. Hydraulic fluid under pressure for operating the actuators 29 and 39 can be provided, for example, by an engine and pump assembly 41 carried by the frame 13. The apparatus 11 may also include a grading member, such as a scraper 43 mounted on the forward end of the frame 13.

The apparatus 11 may be used in the trench 17 to install inner component sections, such as the inner component sections 51a, 51b, 51c. Although the inner component sections may be of different constructions as indicated above, in the embodiment illustrated, each of them is an identical precast cylindrical pipe of concrete material. As shown in FIG. 7, the inner component section 51b has an axial cylindrical passage 53, and as shown in FIG. 1, each of the inner component sections has a projecting annulus 55 at one end and a recess 57 at the other end sized and configured to mate with the annulus 55 of an adjacent inner component section.

For purposes of illustration, it is assumed that the inner component sections 51a and 51b have been installed and no formable outer component has been placed around the inner component sections. The previously placed inner component sections 51a and 51b are supported on supports 59 which rest on the bottom 15 of the trench 17. Although the supports 59 may be of different kinds and construction as referred to above, for illustrative purposes, it is assumed that each of the supports 59 is in the form of an inflatable saddle (FIG. 7). The annulus 55 of the inner component section 51b is received in, and interlocked with, the recess 57 of the inner component section 51a, and this also forms a part of the support for these two inner component sections.

In the position of FIG. 1, the inner component section 51b may also be partially supported on the rearward end portions of the rails 21 and 23.

With the inner component sections 51a and 51b supported as described above and with the actuator 39 retracted as shown in FIG. 1, a major length of the rails 21 and 23 is open to receive the inner component section 51c. The inner component section 51c is deposited on the rails 21 and 23 from above utilizing a crane 61 or other suitable device. With the inner component section 51c supported on the rails 21 and 23, the actuator 29 can be operated to move the adjusting plate 25 as required to align the inner component section 51c with the inner component section 51b.

With the inner component section 51c properly aligned, the actuator 39 is energized to move the trolley 35 and the pushing member 37 to the left as shown in FIG. 2 to slide the inner component section 51c to the left into interlocking engagement with the inner component section 51b. The inner component sections 51a-51c may be considered as relatively immovable due to their weight and/or their placement against a relatively immovable object such as a bulkhead. Accordingly, further extension of the actuator 39 moves the apparatus 11 to the right as shown in FIGS. 3 and 4. As the apparatus 11 moves to the right, the scraper 43 shapes the bottom 15 of the trench 17.

Following full extension of the actuator 39 as shown in FIG. 4, the actuator 39 is retracted to the position shown in FIG. 5 to provide a space for another inner component section. Also, one or more of the supports 59 is placed beneath the inner component section 51c and inflated so that the inner component section 51c is now supported in the same manner described above for the inner component section 51b in the position of FIG. 1, i.e., by the inner component section 51b, the support 59, and the outer ends of the rails 21 and 23.

Additional inner component sections can be installed in the same manner. The first of the inner component sections to be installed can be installed, for example, by conventional means such as a crane which positions the inner component section on supports 59.

At a suitable time, formable outer component material 63, such as concrete, is placed at least beneath the previously installed inner component sections 51a-51c. This may be accomplished, for example, by pumping the inner component material 63 using a pump 65 from a hopper 67 through a valve 69 and a hose 71 to a region below the inner component sections 51a-51c. When completed, this provides a pipeline which includes an inner component 73 (FIG. 9) and an outer component 75 which may extend completely around or part way around the inner component 73. The inner component 73 includes the inner component sections 51a-51c. The supports 59 may be deflated and removed as the outer component material 63 is being pumped beneath the inner component sections or may be allowed to remain as part of the pipeline.

The outer component 63 is not pumped beneath a particular inner component section while the support 59 for such inner component section is being transferred from the apparatus 11 to the support 59. Rather, initiation of the flow of inner component material 63 to a particular inner component section is not undertaken until that inner component section is no longer supported by the rails 21 and 23.

FIG. 8 shows how the inner component sections, such as the inner component section 51b, can be supported by a support 59a. The construction of FIG. 8 can be used when the section 51b is of relatively large diameter. The support 59a includes a shoe 77 engaging the upper, inner wall of the inner component section 51b and a shoe 79 supported on the bottom 15 of the trench 17. The support 59a also includes a jack 81 projecting through an opening 83 in the bottom of the inner component section 51b and having its opposite ends in engagement with the shoes 77 and 79. By extending and retracting the jack 81, the height of the inner component section 51b above the bottom 15 of the trench can be adjusted. Like the supports 59, the support 59a can be installed, for example, while the inner component section is supported at one end by the previously laid inner component section and at the other end by the rails 21 and 23. The shoe 77 and the jack 81 can be removed from within the inner component section as the outer component 75 is being placed.

The rails 21 and 23 can be moved transversely of the frame 13 by the hydraulic actuator 29. For example, the rails 21 and 23 may be shifted to the dashed line position shown in FIG. 6. When this occurs, the universal joint 40 pivots to allow the actuator 39 to assume the angular orientation shown in dashed lines in FIG. 6. Similarly, the universal joint 42 allows the trolley 35 to pivot relative to the actuator 39 so that the wheels 36 can continue to ride on the rails 21 and 23. With this construction, an effective reactive pushing force can be provided by the actuator 39 for the purpose of removing the inner component section from the rails 21 and 23 and for advancing the apparatus 11 even when the pipeline is not linear.

Although exemplary embodiments of the invention have been shown and described, many changes, modificationss and substitutions may be made by one having ordinary skill in the art without necessarily departing from the spirit and scope of this invention.

I claim:

1. A method of forming a pipeline which is at least partially underground and which includes, at least during construction of the pipeline, a plurality of inner component sections at least partially enclosed by a formable outer component, said method comprising:

providing an apparatus for at least assisting in installing the inner component sections with such apparatus being on a surface which is to support the pipeline;

depositing a first of the inner component sections on at least a portion of said apparatus;

at least partially supporting the first inner component section on the apparatus;

providing inner component section supporting means with such supporting means being supported by said surface;

forcing the first inner component section at least partially from the apparatus to the supporting means to transfer at least some of the support of the inner component section to the inner component section supporting means;

depositing a second of the inner component sections on said apparatus;

repeating said step of forcing for said second inner component section; and placing the outer component at least beneath the first component section subsequent to said step of forcing for the second inner component section.

2. A method as defined in claim 1 including aligning the second inner component section with the first inner component section while the second inner component section is at least partially supported on the apparatus and at least partially carrying out said step of aligning utilizing said apparatus.

3. A method as defined in claim 1 wherein said step of providing an apparatus includes providing the apparatus with reactive pushing means, said first-mentioned step of forcing includes pushing on the first inner component section with the reactive pushing means to move the first inner component section at least partially from the apparatus to transfer at least some of the support of the first inner component section to the supporting means, and said method includes arresting the movement of the first inner component section and continuing said step of pushing to advance the apparatus.

4. A method as defined in claim 3 wherein said step of providing an apparatus includes providing the apparatus with a grading member and grading said surface utilizing the grading member during said step of advancing.

5. A method as defined in claim 1 wherein said step of providing inner component section supporting means includes providing inflatable supporting means supported by said surface and inflating the inflatable supporting means.

6. A method as defined in claim 1 including adjusting the elevation of the first and second inner component sections when such inner component sections are on the inner component section supporting means.

7. A method of forming a pipeline of the type which is at least partially underground and which includes, at least during construction of the pipeline, a plurality of inner component sections at least partially enclosed by a formable outer component, said method comprising:
providing an apparatus for at least assisting in installing the inner component sections with the apparatus being on a surface which is to support the pipeline;
repeatedly and sequentially depositing inner component sections on at least a portion of the apparatus;
at least partially supporting on the apparatus each of the inner component sections which is deposited on the apparatus;
providing inner component section supporting means on said surface;
forcing each of the inner component sections supported on the apparatus from the apparatus to the supporting means to thereby transfer at least some of the support of the inner component sections to the inner component section supporting means and to place the inner component sections in end-to-end relationship;
placing the formable outer component at least beneath the inner component sections supported by the inner component section supporting means to thereby provide additional support for the inner component sections; and
initiating said step of placing for a plurality of said outer component sections subsequent to said step of forcing said plurality of inner component sections.

8. A method as defined in claim 7 including discontinuing said step of forcing after said plurality of the inner component sections have been forced from the apparatus and are supported by the supporting means and carrying out said step of initiating subsequent to said step of discontinuing.

9. A method as defined in claim 7 including carrying out said steps of placing and forcing nonsimultaneously.

10. A method as defined in claim 7 wherein said step of placing includes flowing concrete at least beneath the inner component sections.

11. A method as defined in claim 7 wherein the outer component includes a hardenable substance and said method includes allowing the hardenable substance to join the outer component to the inner component sections whereby the outer component and the inner component sections are essentially an integral structure.

12. A method as defined in claim 7 wherein the step of providing an apparatus includes providing an apparatus which includes a frame and support section attached to the frame for pivotal movement, said step of depositing includes depositing the inner component sections on the support section, and said method includes angularly adjusting the support section relative to the frame.

13. A method as defined in claim 12 wherein the step of providing an apparatus includes providing an extendable actuator on the frame and said step of forcing includes pushing on the inner component sections supported on the support section with the actuator.

14. A method as defined in claim 5 including at least partially deflating the inflatable supporting means and removing the deflated inflatable supporting means from beneath the inner component section.

15. An apparatus for forming a pipeline which includes, at least during construction of the pipeline, a plurality of inner component sections, said apparatus comprising:
a frame,
a support section adapted to support an inner component section thereon;
means for attaching the support section to the frame to permit movement of the support section generally transversely relative to the frame whereby the axes of the frame and the support section can be angularly adjusted to align the inner component section supported on the support section;
an extendable actuator;
means for attaching one region of the actuator to the frame for pivotal movement;
means for mounting a second region of the actuator for movement along said support section; and
a pushing member coupled to the actuator and engageable with the inner component section supported by the support section whereby upon extension of the actuator, the pushing member forces the inner component section on the support section away from the frame.

16. An apparatus as defined in claim 15 wherein said support section includes at least one rail and said mounting means includes at least one roller adapted to roll along said rail.

17. An apparatus as defined in claim 15 wherein the attaching means for said one region includes a first universal joint for attachment of the first region of the actuator to the frame and the mounting means includes a second universal joint for attachment of the pushing member to the second region of the actuator.

18. An apparatus as defined in claim 15 including a grading member mounted on said frame, said frame being generally intermediate said grading member and said support section.

* * * * *